3,455,858
SELF-CATALYZED CURABLE COMPOSITIONS CONTAINING AN EPOXY AND A VINYL MODIFIED ACIDIC POLYESTER
David D. Taft, Edina, Minn., assignor to Ashland Oil & Refining Company, Ashland, Ky., a corporation of Kentucky
No Drawing. Continuation-in-part of application Ser. No. 527,093, Feb. 14, 1966. This application Aug. 8, 1966, Ser. No. 570,690
Int. Cl. C08f 21/00; C08g 30/14; C08h 9/00
U.S. Cl. 260—22
14 Claims

ABSTRACT OF THE DISCLOSURE

Modified acidic polyesters being the copolymer of:

(a) An ethylenically unsaturated polyester which is the esterification reaction product of polyhydric alcohol and certain polycarboxylic acids wherein the ratio of carboxyl groups to hydroxyl groups before esterification was from 1:1 to 3:1, and (b) From 5 to 300% based on the weight of the unsaturated polyester of vinyl monomer of which 1–100 weight percent of said vinyl monomer is an N-($C_1$–$C_8$ alkyl)-amino ($C_2$–$C_6$ alkyl) ester of acrylic or methacrylic acid, an N,N-di($C_1$–$C_8$ alkyl)-amino($C_2$–$C_6$ alkyl) ester of acrylic or methacrylic acid, or a mixture of such esters.

These polyesters are useful as epoxy curing agents with which they form coating compositions useful as decorative and protective coatings on substrates of wood, metal, concrete and the like.

---

This is a continuation-in-part of Ser. No. 527,093, filed Feb. 14, 1966, now abandoned.

The present invention relates to self-catalyzed curable compositions containing both an epoxy and a vinyl-modified acidic polyester. In one aspect, this invention relates to a multiple-package coating vehicle containing, in a first package, a curable epoxy component (e.g. epoxidized soybean oil) and, in a second package, a vinyl-modified polyester which serves as a curing agent for the epoxy component. When mixed together, the contents of these two packages are capable of reacting to form hard, flexible, mar-resistant films on a variety of substrates (e.g. wood, metal, concrete, and the like). Because of the special nature of the vinyl-modified polyester, the curing reaction between the polyester and the epoxy component is self-catalyzed.

In U.S. Patent 3,218,274 (incorporated herein by reference) Robert A. Boller and Dr. Richard B. Graver have described and claimed a two-package coating composition. One of the two packages contained a curable epoxidized fatty compound (e.g. epoxidized soybean oil). The other package contained an acidic polyester curing agent for the epoxidized fatty compound of the first package. At or about the time of use, the contents of the two packages were mixed and the resulting mixture spread in film form on a suitable substrate (e.g. wood) and cured (e.g. by baking or air drying) to thereby provide a decorative or protective coating.

One significant advantage of a preferred embodiment of that two-package coating composition has been its ability to form thin films which can cure at room temperature (without a requirement for a catalyst) to form hard, tack-free, mar-resistant, durable coatings. Less preferred embodiments are cured by baking. Cured coatings (e.g. coatings on wood or metal) prepared from this two-package coating composition have exhibited highly desirable properties in terms of (1) their non-yellowing tendency, (2) their ability to retain their original hard gloss for years without fading (although they can be made with a low gloss), (3) their durability, (4) their ability to be applied by brushing, spraying or rolling on common substrates such as wood, concrete, and metal, and (5) the ease with which dirt and common stains can be removed. On concrete or earthenware, this coating composition provides a glazed, ceramic-like appearance.

Subsequently, I found that polyester curing agents of the type developed by Boller and Graver could be chemically modified with vinyl monomers to improve certain properties of the cured films obtained therefrom (e.g. to improve the caustic resistance). Additionally, I found that by using my vinyl modified polyester curing agents, I was able to obtain useful films (both free and supported) by co-reaction with a wide variety of epoxy components. While I have generally preferred to employ epoxidized fatty compounds (e.g. epoxidized linseed oil) as the primary or only epoxy component, I can use other epoxidized compounds as part or all of the epoxy component.

I have now discovered that it is possible to further improve the epoxy/polyester system if one employs certain functional vinyl monomers to modify the acidic polyesters. Although the manufacturing procedure is substantially the same as that employed in Ser. No. 527,093, the results obtained by the use of the functional vinyl monomers as described herein are not the same. When functional vinyl monomers (e.g. alkyl or dialkyl aminoalkyl acrylates or methacrylates) are employed according to the present invention, the rate of cure in thin films of epoxy/polyester mixtures is significantly increased, while the pot-life is not appreciably altered (compared with the epoxy/polyester blends of U.S. 3,218,274). For some reason, presently unknown, the functional group introduced into the acidic polyester via the functional monomer has a catalytic effect on the curing of the epoxy component in thin films (i.e. wet films less than 0.01 inch thick, e.g. a 0.003 inch wet film).

The modified polyester curing agent

According to my invention, polyester curing agents of the type shown in U.S. 3,218,274 are first prepared using as a part of the ester forming ingredients, (1) a copolymerizable polycarboxylic acid or anhydride containing ethylenic unsaturation (e.g. maleic acid or anhydride) and, optionally, (2) a copolymerizable polyhydric alcohol containing ethylenic unsaturation (e.g. di-allyl ether of trimethylolpropane). During or subsequent to the formation of the unsaturated polyester just described, it is copolymerized (using conventional polymerization techniques) with from 5 to 300 weight percent, preferably from 5 to 100 weight percent, e.g. 10 to 60 weight percent, of a mixture containing from 1–100 weight percent of an N-alkyl or N,N-dialkyl aminoalkyl ester of acrylic acid or methacrylic acid with the balance of the mixture being a copolymerizable vinyl monomer (e.g. butyl methacrylate). The percentages just referred to are based on the weight of the unmodified acidic polyester.

The resulting vinyl modified acidic polyester curing agent can be viewed as a polyester curing agent which has been modified by chemically bonding a vinyl polymer thereto. While not wishing to be bound to any theory, I believe that this vinyl tail, hanging from the acidic polyester curing agent, in some way protects or screens ester linkages and thereby renders cured films obtained from this system more resistant to caustics and certain solvents. Further, the reactive amino groups present in this vinyl tail increase the curing rate of thin film of the epoxy/polyester blends.

The unmodified acidic polyester curing agents are the simple esterification reaction products of polyhydric alcohols and polycarboxylic acids (or anhydrides). The unmodified polyester curing agent can be viewed as a partial ester or as a carboxyl-terminated polyester having an average of at least two free carboxyl groups per ester molecule. It is convenient to think of the unmodified polyester curing agent as being a polyhydric alcohol having at least two, and preferably three or four, hydroxyl groups each esterified with polycarboxylic acid.

Suitable polyhydric alcohols include the simple polyhydric alcohols such as ethylene glycol, propylene glycol, glycerol, trimethylol ethane, trimethylol propane, sorbitol, pentaerythritol, di-pentaerythritol, tri-pentaerythritol, and the like, as well as the copolymerizable polyhydric alcohols such as the mono-allyl ethers of trimethylol propane, the monoallyl ether of ethylene glycol, the mono-allyl ethers of pentaerythritol, the mono-allyl ethers of sorbitan, the mono-allyl ethers of glycerol, the di-allyl ethers of pentaerythritol, the tri-allyl ethers of mannitol, and the like. Typically, these polyhydric alcohols will contain from 2–24, e.g. 5–23 carbon atoms and 2 or more (e.g. 3–8) free or unreacted hydroxy groups. Mixtures of polyhydric alcohols can be used. Also, fatty acid partial esters of saturated aliphatic polyhydric alcohols can be used as part or all of the polyhydric alcohol component provided the partial ester contains at least 2, and preferably 3 or more, free hydroxyl groups. The saturated, aliphatic polyhydric alcohols, particularly those saturated, aliphatic polyhydric alcohols having 3 or more hydroxyl groups and having no hydrogen atoms attached to the beta carbon atom(s) (i.e. beta with respect to the hydroxyl groups) are preferred. Pentaerythritol (pure or technical grade) and its mono-fatty acid (e.g. $C_8$–$C_{22}$ fatty acid) esters are particularly preferred.

Since it is necessary to introduce a copolymerizable ethylenic bond into the acidic polyester curing agent, part (e.g. 2 to 90 mole percent of the total amount of polycarboxylic acid must be a copolymerizable ethylenically unsaturated polycarboxylic acid (or anhydride), or a mixture thereof. For purposes of this disclosure, the benzene carboxylic acids (e.g. phthalic acid) are not considered as possessing a copolymerizable double bond. The preferred unsaturated copolymerizable polycarboxylic acid is maleic acid (or its anhydride). Other suitable copolymerizable polycarboxylic acids are itaconic acid, citraconic acid, fumaric acid, and the like. Generally, the copolymerizable polycarboxylic acid (or a mixture thereof) will amount to from 2–75 mole percent, preferably 5–30 mole percent, e.g. 10 mole percent of the mixture of polycarboxylic acids.

A chlorinated polycarboxylic acid (e.g. hexachloroendomethylene tetrahydrophthalic acid) will always be used as part of the total amount of polycarboxylic acid. At least 5 mole percent and more usually from 25–75 mole percent of the mixture of polycarboxylic acids will be chlorinated polycarboxylic acid. While chlorendic acid is the most preferred chlorinated acid, other chlorinated polycarboxylic acids can be used. Such other acids include hexachlorophthalic acid, tetrachlorophthalic acid, monochlorophthalic acid, dichloromaleic anhydride, and the like.

Other polycarboxylic acids can also be included in the mixture of polycarboxylic acids. Such other acids include trimellitic acid, tetrahydrophthalic acid, hexahydrophthalic acid, isophthalic acid, phthalic anhydride, and the like.

A preferred mixture of polycarboxylic acids is one containing only (1) chlorendic acid, (2) maleic acid or maleic anhydride and (3) one or more phthalic acids (or anhydrides). Especially preferred is such a mixture wherein the only phthalic acid present is phthalic anhydride. However, if the polyhydric alcohol to be used is not a simple polyhydric alcohol such as pentaerythritol (or mixture thereof), but is instead a partial ester of a polyhydric alcohol (e.g. pentaerythritol mono-oleate), it is then often advantageous to use a mixture of only chlorendic acid and maleic acid or maleic anhydride as the polycarboxylic acid component.

In preparing the unmodified acidic polyester curing agents of this invention, the esterification reaction mixture should initially contain (i.e. before any esterification takes place) a ratio of free carboxyl groups to free hydroxyl groups of from 1:1 to 3:1. Preferably, this ratio will be within the range of from 1.5:1 to 2.2:1, and even more preferably about 1.8 carboxyl groups for each hydroxyl group. In making this calculation, anhydride groups are treated as being the equivalent of two (2) carboxyl groups. The esterification reaction is conducted to preferably react most or all of the available hydroxyl groups.

When the amount of vinyl monomer to be used is small (e.g. 5% based on the weight of polyester) functional vinyl monomers can be used alone. However, if the amount of vinyl monomer to be used is substantial (e.g. 50% based on the weight of the polyester), a mixture of functional and non-functional vinyl monomers will be used. This is because too much of the functional vinyl monomer can over-catalyze the epoxy/polyester system and cause instability problems. Such mixtures will contain at least 3 weight percent (based on the mixture weight) of functional monomers. Usually, such mixtures will contain 5–25 weight percent of the functional monomers with the balance being the nonfunctional monomers.

Suitable functional monomers are the N-($C_1$–$C_8$ alkyl) and the N,N-($C_1$–$C_8$ di-alkyl)aminoalkyl esters of acrylic and methacrylic acids wherein the aminoalkyl portion of the ester contains 2–6, e.g. 2–3 carbon atoms. Examples of such functional monomers are N,N-dimethyl($\beta$-aminoethyl) acrylate, N,N-diethyl aminoethyl methacrylate, N,N-diethyl aminoethyl acrylate, N-t-butyl aminoethyl methacrylate, N,N-diethyl($\alpha$-aminopropyl) methacrylate, N,N-dimethyl($\alpha$-aminopropyl) acrylate and the like. The unsubstituted "N" monomers (e.g. aminoethyl acrylate) are not effective in the practice of this invention because they produce unwanted reaction products.

Suitable non-functional vinyl monomers are styrene, vinyl toluene, vinyl acetate, dialkyl maleate, the $C_1$–$C_{18}$ alkyl and $C_1$–$C_{18}$ (alkoxy alkyl) esters of acrylic and methacrylic acids, and the like. Styrene and the esters of acrylic and methacrylic acids are the preferred non-functional vinyl monomers. Use of the lower alkyl esters (e.g. methyl methacrylate) generally results in harder films while the use of higher alkyl esters (e.g. lauryl methacrylate) provides more flexibility in the cured films. Examples of such non-functional acrylic and methacrylic monomers are methyl acrylate, ethyl acrylate, n-propyl acrylate, isopropyl acrylate, n-butyl acrylate, isobutyl acrylate, n-amyl acrylate, isoamyl acrylate, hexyl acrylate, 2-ethylhexyl acrylate, octyl acrylate, 3,5,5-trimethylhexyl acrylate, decyl acrylate, lauryl acrylate, dodecyl acrylate, cetyl acrylate, octadecyl acrylate, octadecenyl acrylate, ethyl methacrylate, n-propyl methacrylate, isopropyl methacrylate, butyl methacrylate, n-amyl methacrylate, sec.-amyl methacrylate, methyl methacrylate, 2-ethylhexyl methacrylate, octyl methacrylate, 3,5,5-trimethylhexyl methacrylate, decyl methacrylate, dodecyl methacrylate, octadecyl methacrylate, butoxyethyl acrylate, butoxyethyl methacrylate, other alkoxyalkyl acrylates or methacrylates, and the like. Mixtures of two or more non-functional vinyl monomers can be used, e.g., a mixture of ethyl acrylate and isobutyl acrylate. The $C_1$–$C_5$ alkyl esters of methacrylic acid (e.g. butyl methacrylate or methyl methacrylate) are especially preferred non-functional vinyl monomers.

In polymerizing the vinyl monomers, conventional polymerization techniques can be used. Common polymerization catalysts can be used. The polymerization catalyst will usually and preferably be one of the following: azo-bis-i-butyronitrile, cumene peroxide, benzoyl peroxide, or di-t-butyl peroxide. Other suitable organic catalysts can be employed.

The vinyl modified polyester curing agents of this invention should have retained acid values of at least 30 and preferably above 50 on a 100% non-volatile (NV) basis. Acid values above 80, e.g. from 80–180 are especially desirable.

Use of the vinyl modified acidic polyester

The vinyl modified acidic polyester will ordinarily be used as a co-reactant or curing agent with various epoxy components. Thus, for coatings applications, an epoxy component (e.g. epoxidized soybean oil or a bisphenol-epichlorohydrin resin), the vinyl modified acidic polyester curing agent, and solvent will be mixed together to thereby form a coatings vehicle, usually in a ratio of 50 to 250 parts by weight of vinyl modified acidic polyester per 100 parts by weight of epoxy component. Optionally, various pigments, fillers, extenders, dyes, driers, stabilizers, and the like can be added to the epoxy component, to the polyester component, or to the resulting mixture to thereby form, for example, a paint. The resulting mixture is then applied in film form to a suitable substrate by, for example, brushing. These wet films are then cured to a tack-free state. Curing can be by air-drying at room temperature or can be accelerated by baking. Partial pre-reaction of the epoxy and polyester components and catalysis can be used to speed the curing or drying time. However, it should be noted that the coating vehicle (i.e. the mixture of only solvent, epoxy and polyester) can co-react and cure in the absence of any additional or supplemental curing agent or catalyst. Although supplemental curing agent or catalyst. Although supplemental curing agents or catalysts (e.g. various amines) for the epoxy component can be added to the two-package coating vehicle of the present invention, the preferred epoxy/polyester coating vehicle of the present invention is capable of curing in thin films (e.g. 3 mil wet films) to a tack-free state at room temperature in the absence of any additional curing agent for the epoxy component.

Suitable epoxy components are the epoxidized fatty compounds (e.g. epoxidized linseed oil), the bisphenol-epichlorohydrin resins (e.g. Epon 828), various alicyclic diepoxides (e.g. Unox 201), etc. Because of differences in performance (e.g. as reflected by the speed of drying, hardness, flexibility, tendency to yellow, and the like), I prefer to use an epoxidized fatty compound (or a mixture thereof) as the predominant (i.e. more than 50 weight percent of the epoxy component) or only epoxy component. Such epoxidized fatty compounds include epoxidized fatty oils (e.g. epoxidized soybean oil), epoxidized fatty acid esters of monohydric alcohols (e.g. epoxidized methyl oleate), epoxidized fatty acid esters of polyhydric alcohols (e.g. epoxidized tetra-tall oil ester of pentaerythritol), epoxidized fatty nitriles (e.g. epoxidized oleyl nitrile), epoxidized fatty amides, epoxidized fatty amines, and epoxidized fatty alcohols. Such epoxidized fatty compounds are already well known in the art. Typically, these epoxidized fatty compounds will have 8 to 26 carbon atoms, e.g. 12 to 22 carbon atoms, in each of the fatty radicals and have an internal oxirane value of from 3% to 10%. I prefer that the oxirane value of the epoxidized fatty compounds be at least 5.5%.

Particularly preferred for use as the epoxy component of this invention are the curable epoxidized esters of fatty acids. These epoxidized esters, having internal oxirane, will generally contain from 1 to 10 carbon atoms in the mono- or polyhydric alcohol portion, with or without internal oxirane groups in the alcohol portion. Thus, the following epoxidized fatty acid esters are contemplated for use in this invention: epoxidized soybean oil; epoxidized linseed oil; epoxidized safflower oil; epoxidized 2-ethylhexyl tallate, epoxidized 1,5-pentanediol dioleate; epoxidized 1,2,6-hexanetriol dioleate mono- acetate; epoxidized methyl oleate; epoxidized glycerol trilinoleate; epoxidized glycerol trioleate; epoxidized glycerol monooleate; epoxidized glycerol mono-linoleate; epoxidized glycerol monostearate dilinoleate; epoxidized full esters of mono-, di- or polypentaerythritol with soy, tall or linseed fatty acids; and the like. Mixtures of these esters can be used.

If desired, epoxidized compounds of different types and oxirane values can be blended together to obtain various properties, e.g. improved resistance to yellowing, improved drying speed, and the like. However, it should be realized that improvements in certain properties are usually accompanied by a decrease in some other property. Where a mixture of epoxidized fatty compounds has been used, I prefer that the mixture have an average internal oxirane value of at least 5.5%.

The present invention will be further understood by reference to the following specific examples. Unless otherwise indicated, all parts and percentages are by weight.

EXAMPLES I–II

| Ingredients | Example I, weight, grams | Example II, weight, grams | Comparative run weight, grams |
|---|---|---|---|
| (a) Pentaerythritol (technical grade) | 84 | 84 | 84 |
| (b) Phthalic anhydride | 125.8 | 125.8 | 125.8 |
| (c) Maleic anhydride | 14.7 | 14.7 | 14.7 |
| (d) Chlorendic acid | 386.3 | 386.3 | 386.3 |
| (e) Xylol | 262 | 262 | 262 |
| (f) Butyl methacrylate | 63 | 126 | 70 |
| (g) Methyl methacrylate | 65 | 130 | 65 |
| (h) N,N-dimethyl-β-amino-ethyl methacrylate | 7 | 14 | 0 |
| (i) Di-t-butyl peroxide | 6 | 12 | 6 |
| (j) Xylol | 0 | 0 | 36 |
| (k) Methyl-i-butyl ketone (MIBK) | 36 | 200 | 0 |

In Examples I and II and in the Comparative Run, the following procedure was employed. Ingredients a to e inclusive were added to a three-necked, round-bottomed flask fitted with an agitator, thermometer, nitrogen inlet tube, water trap and reflux condenser. The mixture was esterified by heating at 280°–300° F. until the reaction was complete as evidenced by recovery of the theoretical amount of water (i.e. calculated on the assumed conversion of all of the acid and alcohol to the acidic polyester).

Then, ingredients f to k inclusive (a monomer/initiator mixture) were added to the acidic polyester over a one-hour period at a temperature of 280°–290° F. to thereby modify the polyester with a vinyl polymer. After one hour, an additional one (1) gram of the initiator was added and the reaction mixture held at the reflux temperature for one hour. Upon cooling, the solids were adjusted with MIBK to the desired viscosity.

The vinyl modified polyester of Example I was 67.8% NV, had a viscosity of 85 stokes, and had an acid value of 122 (corrected to 100% NV).

The vinyl modified polyester of Example II was 64.6% NV, had a viscosity of 245 stokes, and had an acid value of 108 (corrected to 100% NV).

The modified polyester of the Comparative Run was 77% NV, had an acid value (corrected to 100% NV) of 119, and a viscosity of 13 stokes when cut to 60% NV in xylol.

EXAMPLES III–VI

In Examples III–VI, 0.003 inch wet films were cast on plate glass from the coating vehicles described in Table I. Epoxy Component A was a mixture of epoxidized linseed oil and epoxidized soybean oil having an average internal oxirane value of 8% and diluted with xylol (90% NV) while Epoxy Component B was the epoxidized full ester of tall oil fatty acids and di-pentaerythritol and had an average internal oxirane value of 5.7%.

TABLE I

| Vehicle composition | Run for comparison | Examples | | | |
|---|---|---|---|---|---|
| | | III | IV | V | VI |
| Epoxy Component A | 20 | 20 | | 10 | |
| Epoxy Component B | | | 9 | | 18 |
| Modified polyester of comparative run | 27.4([1] 21.1) | | | | |
| Modified polyester of Example I | | 31([1] 21.1) | | | 31 |
| Modified polyester of Example II | | | 16.3 | 16.3 | |
| MIBK | 10 | 6.4 | 5 | 5 | 10 |
| Film Properties: | | | | | |
| SWARD hardness: | | | | | |
| (a) Air cure for 16 hrs. at room temperature | 12 | 12 | 12 | 10 | 18 |
| (b) Baked for 30 minutes at 250° F | 36 | 36 | 38 | 28 | 54 |
| Zapon test | ([2]) | ([3]) | ([4]) | | |

[1] The number in parentheses is the weight of solids actually present in the indicated weight of the polyester solution.
[2] Fail 100 gram test in 3 hrs.
[3] Pass 200 gram test in 3 hrs.
[4] Pass 500 gram test in 1 hr.

From the foregoing examples and description it should be clear that the vinyl modified acidic polyesters of the present invention can be used to cure a variety of epoxidized components. By varying the amounts and types of the various reactants, it is possible to obtain a wide variety of film properties. For example, coatings ranging from soft, flexible primers to hard mar-resistant finishes can be obtained. These epoxy/polyester systems can be used to form free films, as caulking compounds, casting resins, laminating resins, adhesives, etc. If desired, the vinyl modified polyesters can be blended with other compatible epoxy curing agents (e.g. the curing agents of U.S. 3,218,274).

Although the present invention has been described with a certain degree of particularity, it will be realized that numerous modifications and variations, as well as uses (e.g. as sealants, etc.) falling within the spirit and scope of this invention, will become obvious to one routinely engaged in this art.

What is claimed is:

1. Modified polyester having an acid value of at least 30 and useful as an epoxy curing agent, said modified polyester being the copolymer of:
   (a) an ethylenically unsaturated polyester which is the esterification reaction product of polyhydric alcohol and polycarboxylic acid wherein the ratio of carboxyl groups to hydroxyl groups before esterification was from 1:1 to 3:1, said polycarboxylic acid comprising a copolymerizable ethylenically unsaturated polycarboxylic acid and at least 5 mole percent chlorinated polycarboxylic acid; and
   (b) from 5 to 300% based on the weight of said unsaturated polyester of vinyl monomer of which 1–100 weight percent of said vinyl monomer is an N,N-di($C_1$–$C_8$ alkyl)-amino($C_2$–$C_6$ alkyl) ester of acrylic or methacrylic acid and the remainder of said vinyl monomer is a non-functional vinyl monomer or a mixture of non-functional vinyl monomers.

2. The modified polyester of claim 1 wherein said non-functional vinyl monomer is $C_1$–$C_{18}$ alkyl ester or $C_1$–$C_{18}$ alkoxyalkyl ester of acrylic or methacrylic acid, styrene, vinyl toluene, vinyl acetate or dialkyl maleate.

3. The modified polyester of claim 2 wherein:
   (a) the acid value of the modified polyester is at least 80;
   (b) the ratio of carboxyl groups to hydroxyl groups before esterification is from 1.5:1 to 2.2:1;
   (c) the polycarboxylic acid includes chlorendic acid or its anhydride;
   (d) the non-functional vinyl monomer is $C_1$–$C_5$ alkyl ester of methacrylic acid; and
   (e) the vinyl monomer is a mixture of functional and non-functional vinyl monomers containing 5–25 weight percent of the functional vinyl monomers.

4. The modified polyester of claim 3 wherein:
   (a) the modified polyester has an acid value of 80–180;
   (b) the polyhydric alcohol is pentaerythritol or its mono-($C_8$–$C_{22}$ fatty acid) ester;
   (c) the polycarboxylic acid includes 25–75 mole percent chlorendic acid and 5–30 mole percent maleic acid or its anhydride; and
   (d) the copolymer contains from 10 to 60% of said vinyl monomer based on the weight of said unsaturated polyester.

5. Modified polyester having an acid value of 80 to 180 and useful as an epoxy curing agent, said modified polyester being the copolymer of:
   (a) an ethylenically unsaturated polyester which is the esterification reaction product of polyhydric alcohol and polycarboxylic acid wherein the ratio of carboxyl groups to hydroxyl groups before esterification was from 1.5:1 to 2.2:1, said polyhydric alcohol being pentaerythritol and said polycarboxylic acid being a mixture of 25 to 75 mole percent chlorendic acid, 5 to 30 mole percent maleic anhydride and the balance being phthalic anhydride; and
   (b) from 10 to 60% based on the weight of said unsaturated polyester of vinyl monomer of which 5 to 25 weight percent of said vinyl monomer N,N-dimethyl-$\beta$-aminoethyl methacrylate and the remainder of said vinyl monomer is a mixture of butyl methacrylate and methyl methracrylate.

6. A coating vehicle capable of forming tack-free films at room temperature in the absence of supplemental catalysts and curing agents, said vehicle consisting essentially of solvent; and
   (a) an epoxy component consisting of at least 80% by weight of epoxidized fatty acid esters of a polyhydric alcohol having at least three hydroxyl groups before esterification; said epoxidized fatty acid ester having 8 to 26 carbon atoms in its fatty radicals and an internal oxirane value of 3% to 10%; and
   (b) the modified polyester of claim 1, from 50–250 parts by weight of polyester being present per 100 parts by weight of epoxy component wherein the functional vinyl monomer comprises approximately 5 to 25 percent by weight of the unsaturated polyester.

7. The coating vehicle of claim 6 wherein:
   (a) said epoxidized fatty acid ester is a mixture of epoxidized linseed oil and epoxidized soybean oil having an average oxirane value of at least 5.5%; and
   (b) the modified polyester is the modified polyester of claim 3.

8. A coating vehicle capable of forming tack-free films at room temperature in the absence of supplemental catalysts and curing agents, said vehicle consisting essentially of solvent; and
  (a) an epoxy component having an internal oxirane value of at least 5.5% and comprising the epoxidized full ester of tall oil fatty acids and dipentaerythritol; and
  (b) the modified polyester of claim 5.

9. The coating vehicle of claim 6 wherein:
  (a) said epoxidized fatty acid ester is a mixture of epoxidized linseed oil and epoxidized soybean oil having an average oxirane value of at least 5.5%; and
  (b) the modified polyester is the modified polyester of claim 5.

10. Substrate coated with the cured film obtained by curing on said substrate, a mixture of the coating vehicle of claim 6.

11. Substrate coated with the cured film obtained by curing on said substrate, a mixture of the coating vehicle of claim 7, said curing being accomplished by air drying at room temperature.

12. The coated substrate of claim 11 wherein the coating vehicle was pigmented and applied as a paint.

13. Substrate coated with the cured film obtained by curing, on said substrate, a mixture of the coating vehicle of claim 8.

14. Substrate coated with the cured film obtained by curing, on said substrate, a mixture of the coating vehicle of claim 9.

References Cited

UNITED STATES PATENTS

| | | | |
|---|---|---|---|
| 2,897,733 | 8/1959 | Shuger | 260—870 |
| 3,211,695 | 10/1965 | Peterson | 260—835 |
| 3,218,274 | 11/1965 | Boller et al. | 260—22 |
| 3,236,802 | 2/1966 | Ferrigno | 260—22 |
| 3,258,438 | 6/1966 | Shaw et al. | 260—22 |

FOREIGN PATENTS

| | | |
|---|---|---|
| 837,696 | 6/1960 | Great Britain. |
| 1,049,574 | 1/1959 | Germany. |

DONALD E. CZAJA, Primary Examiner

R. W. GRIFFIN, Assistant Examiner

U.S. Cl. X.R.

117—124, 133, 134, 148, 161, 167; 260—23, 32.8, 33.6, 37, 40, 835, 836, 870